United States Patent

Bell

[11] Patent Number: 6,061,532
[45] Date of Patent: May 9, 2000

[54] ANIMATED IMAGE PRESENTATIONS WITH PERSONALIZED DIGITIZED IMAGES

[75] Inventor: Cynthia Sue Bell, Webster, N.Y.

[73] Assignee: Eastman Kodak Company, Rochester, N.Y.

[21] Appl. No.: 08/792,820

[22] Filed: Jan. 30, 1997

Related U.S. Application Data

[62] Division of application No. 08/394,083, Feb. 24, 1995, abandoned.

[51] Int. Cl.⁷ .............................. G03B 15/00; A63B 9/00; H04N 5/262; G09G 5/00
[52] U.S. Cl. ............................ 396/661; 463/31; 348/586; 345/113
[58] Field of Search ..................................... 396/429, 661; 463/31; 348/587, 584, 586; 345/113

[56] References Cited

U.S. PATENT DOCUMENTS

| | | | |
|---|---|---|---|
| 4,445,187 | 4/1984 | Best | 364/521 |
| 4,486,774 | 12/1984 | Maloomian | 358/93 |
| 4,602,286 | 7/1986 | Kellar et al. | 358/183 |
| 4,688,105 | 8/1987 | Bloch et al. | 358/335 |
| 4,710,873 | 12/1987 | Breslow et al. | 364/410 |
| 4,745,424 | 5/1988 | Cardaire | 354/354 |
| 4,776,796 | 10/1988 | Nossal | 434/94 |
| 4,827,344 | 5/1989 | Astle et al. | 358/183 |
| 4,859,050 | 8/1989 | Borah et al. | 351/210 |
| 4,994,832 | 2/1991 | Spector | 354/110 |
| 5,009,626 | 4/1991 | Katz | 446/391 |
| 5,111,224 | 5/1992 | Spector | 354/135 |
| 5,262,808 | 11/1993 | Mauchan | 354/108 |
| 5,272,025 | 12/1993 | Wheeler | 396/429 X |
| 5,278,662 | 1/1994 | Womach et al. | 358/335 |
| 5,383,027 | 1/1995 | Harvey | 358/296 |
| 5,387,955 | 2/1995 | Cocca | 354/76 |
| 5,541,656 | 7/1996 | Kare et al. | 348/334 |
| 5,982,350 | 11/1999 | Hekmatpour et al. | 345/113 |

Primary Examiner—W. B. Perkey
Attorney, Agent, or Firm—Francis H. Boos, Jr.

[57] ABSTRACT

Personalized story presentations, such as video movies, are prepared with the aid of a kit including a film camera, pose instruction set and chroma-key backdrop. The camera is preferably a special single-use camera having a visual aid strip seen in the viewfinder showing a series of poses associated with a selected story line. An optional audio accessory is provided to capture spoken phrases and other sounds to be associated with the presentation. The exposed film and sound recording are submitted to a photofinisher/image processor where the images and audio are digitized and incorporated into a preexisting digitized story using existing image processing programs. When completed, the personalized story is recorded on suitable playback media and returned to the customer. The same process can be used to create interactive game programs.

3 Claims, 5 Drawing Sheets

ANIMATED IMAGE PRESENTATIONS WITH PERSONALIZED DIGITIZED IMAGES

This is a Division of application Ser. No. 08/394,083, filed Feb. 24, 1995 abandoned.

FIELD OF THE INVENTION

The invention relates generally to the field of animated displays, such as video games or prepared video story presentations. More particularly, it relates to apparatus and methods for creating and merging actual user images into video displays to create personalized, animated video displays.

BACKGROUND OF THE INVENTION

Video games generally involve animated graphical or cartoon characters in their display which are created by the game creator and are not changeable. U.S. Pat. No. 4,710,873 discloses a technique for substituting a digitized image of real life person for the game character. This involves only the face of the person and the image, once merged into the game is fixed and does not change, giving a somewhat artificial appearance.

Camcorders are commonly used to produce home movies which are either unplanned as to format (e.g. scenes of a birthday party) or, if staged, are usually of an amateurish nature and uninteresting. A technique that uses a video booth to merge the image of a person into a pre-recorded video to create more interesting animated scenes is disclosed in U.S. Pat. No. 4,688,105. This is done by means of blue-field chroma key removal of a screen behind the customer. A video camera captures the live video of the customer which is then merged into the pre-recorded video. This approach, however, does not allow the customer to take advantage of many computer-based digital effects. It also limits personalization, as only images of the customer in the booth can be included. A relatively new concept on the market offered by Kideo Productions of New York City creates a personalized story on videotape. The use selects a story and submits a suitable print of the "star" to be incorporated into the video. This appears to be similar to the video game concept described above in which fixed images are used in the resultant video.

It is therefore desirable to provide apparatus and method for creating personalized video presentations in which individual images can be merged with pre-existing video programs to provide more realistic and entertaining presentations than heretofore proposed.

SUMMARY OF THE INVENTION

Thus in accordance with one aspect of the invention, there is provided a method of preparing animated image presentations incorporating personalized digitized images merged into a preexisting animated image presentation format; wherein the method comprises posing of a subject in a series of predefined poses corresponding to image objects to be incorporated into said animated image presentation; capturing said subject poses on an image capture medium as a sequence of subject pose images; and converting said images on the medium into digitized image signals suitable for digital image processing. The method of the invention further comprises extracting and storing said digitized images of subject poses in an image processing system as a sequence of digitized image objects; and incorporating said digitized image objects into an animated image presentation for subsequent display as animated representations of the subject in the presentation.

In another aspect of the invention, there is provided a kit of materials to be used for preparing personalized images for digitization and incorporation into an animated image presentation on a recording medium, wherein the kit comprises an image capture medium, such as a single-use photographic camera; and an instruction set providing instructions for posing of a subject in a series of poses associated with scene content of the animated image display, the poses to be captured as subject images on the image capture medium. Preferably, the kit would also include a backdrop for use in posing the subject, the backdrop having a characteristic thereof adapted to facilitate isolation of the subject in subsequent image processing employed to incorporate said poses in the animated presentation.

In yet another aspect of the invention, a camera is provided for capture of subject poses in a format suitable for incorporation into a digitized animated image presentation, wherein the camera comprises a viewfinder, an exposure gate, means for advancing an elongated image capture medium sequentially past the exposure gate. The camera also includes an elongated strip of transparent material bearing a sequence of pose graphics and means for advancing said elongated strip through said viewfinder in synchronism with advancement of said image capture medium past the exposure gate, whereby said sequence of pose graphics serves to assist the camera user in posing a subject for capture of a sequence of predefined poses on the capture medium, the poses corresponding to objects to be used in the digitized animated image presentation.

DETAILED DESCRIPTION OF THE INVENTION

Figure 1:
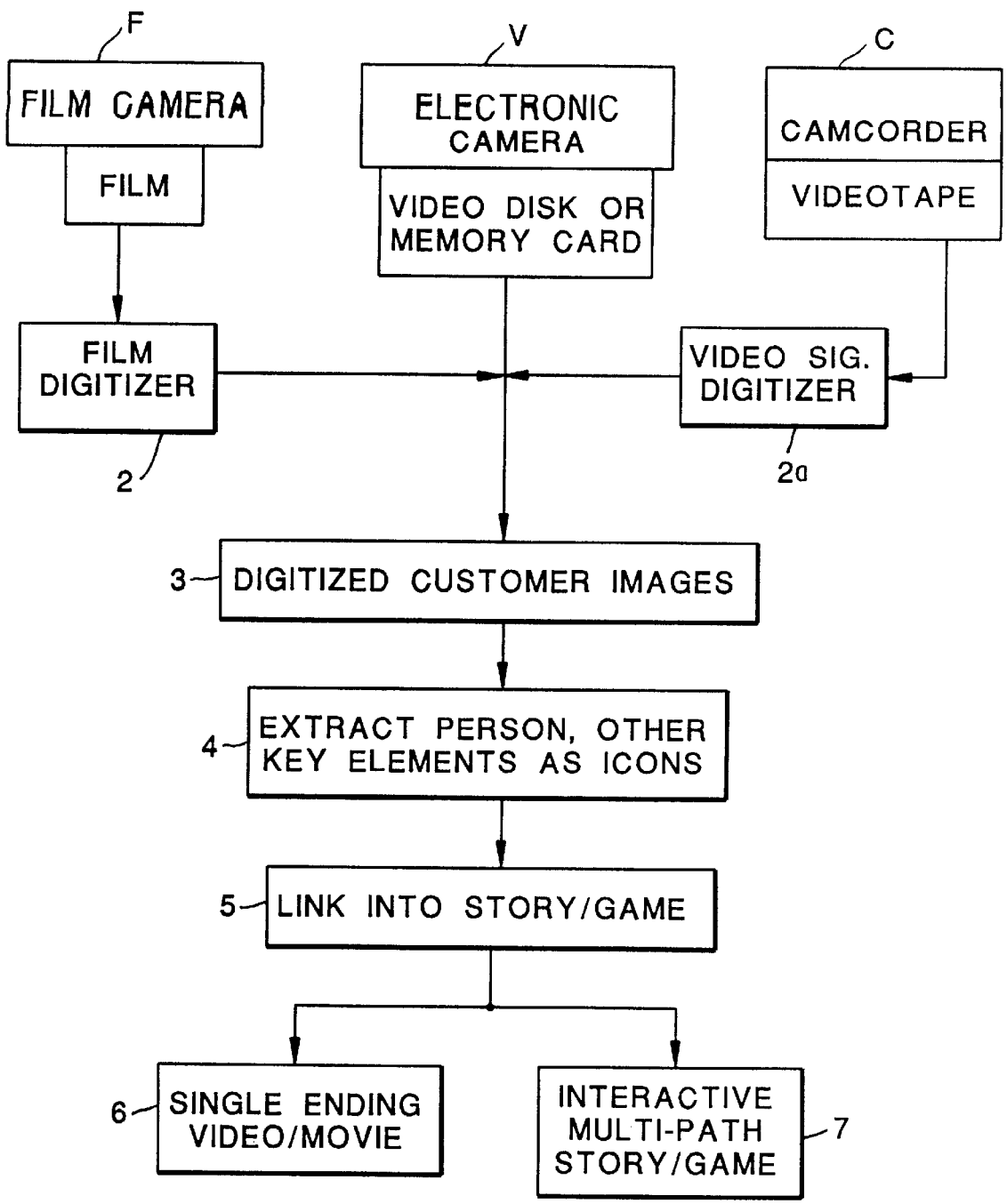
FIG. 1 is a system flow block diagram illustrating the personalized video process of the invention.

FIG. 1 is a system block diagram providing an overview of the alternative media paths which can be used in the present invention. The top row shows the image capture device alternatives: a film camera, F, an electronic still camera, V, a camcorder, C. The images recorded on the respective media, film for the camera, video disc or digital memory card for the still camera or videotape for the camcorder, are read (block 3) into a workstation computer. For film media, it is necessary that the film images be digitized (block 2) in a scanner. When an analog video camcorder is used as the image source, a digitizing frame grabber (block 2a) is necessary to extract the still images. An example of a suitable unit would be the "Snappy Video Snapshot" device available from Play, Inc. Additionally, the process would be most efficient when the image signals from either source are electronically tagged for easy location of the desired still image. With setup assistance from an operator, image editing software in the workstation extracts key elements (block 4) from some images based on image capture instructions and script associated with a preset story line, as described below. These elements are stored as icons and are passed on to videotape creation software (block 5) in the workstation along with other unmanipulated background scenes. In the videotape creation program, the images, icons and background scenes, are imported and linked into the proper places in the script. The video creation program then produces the desired personalized video movie (block 6) or interactive story or game (block 7).

Figure 2:
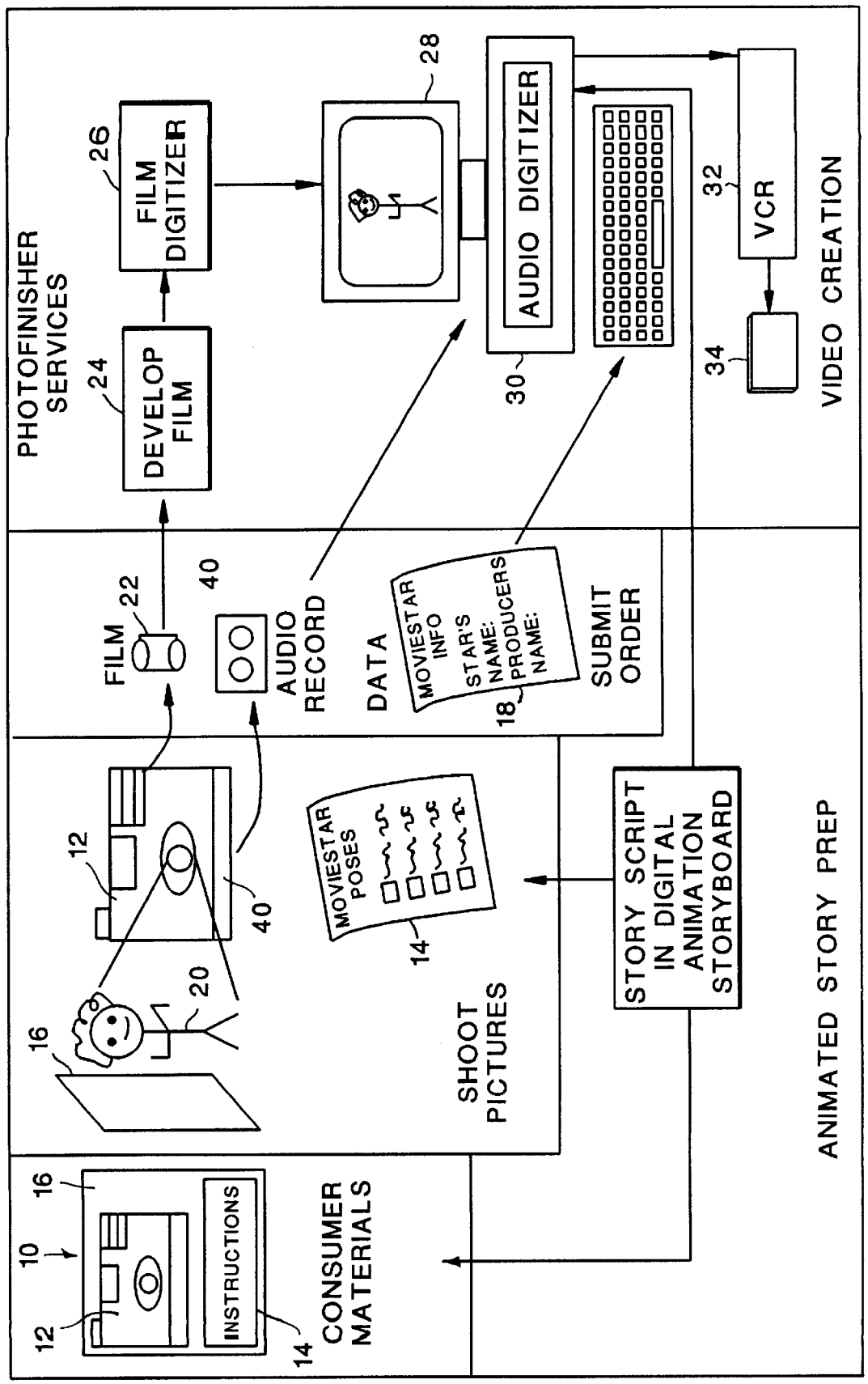
FIG. 2 is a diagrammatic illustration of a kit and method for creating personalized videos in accordance with the present invention.
Figure 3A:
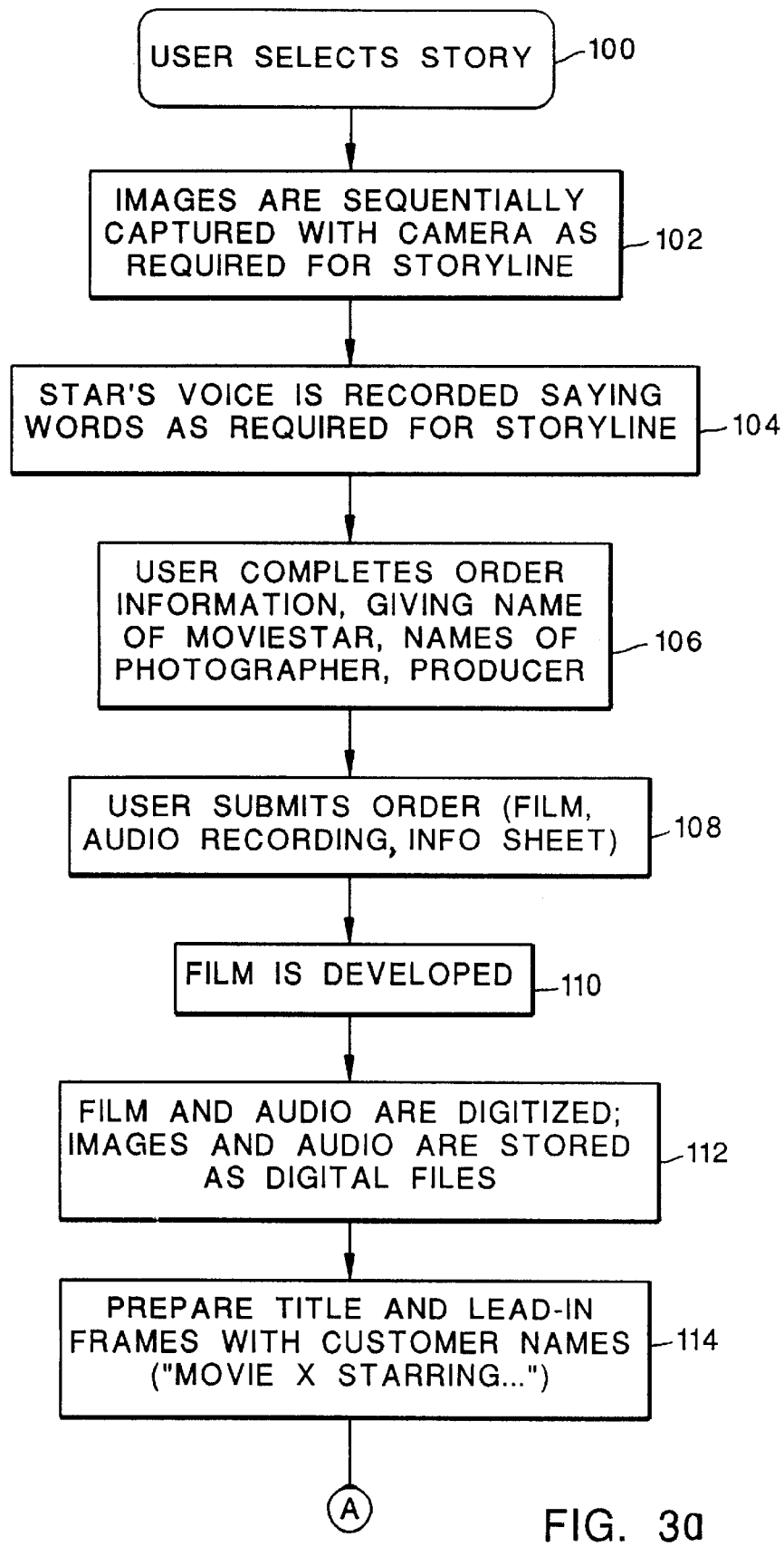
FIGS. 3a and 3b show a flow chart illustrating the steps of the present invention.
Figure 3B:
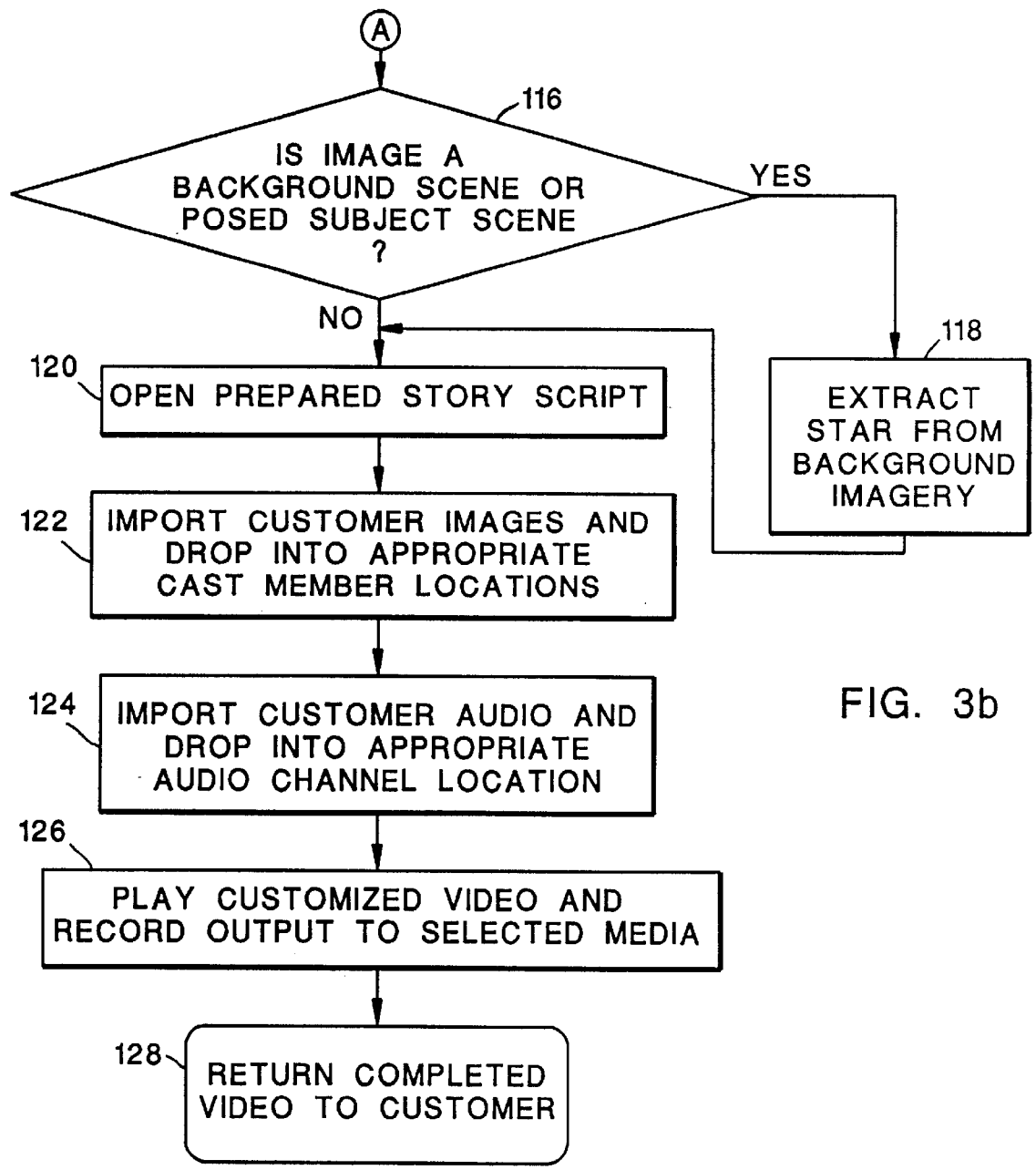

Referring now jointly to FIGS. 2, 3*a* and 3*b*, a consumer desiring to create a personalized video may purchase a kit 10 including a camera 12, an instruction set 14, and an order form 18 which may include an optional data questionnaire section. The order form is for use in having the film in the camera processed. The questionnaire data includes provision for the consumer to provide a title, date and name of the "star" 20 and such other information as appropriate to further personalize the resulting video. The instruction set 14 provides written and pictorial instructions to the consumer showing the various viewing scenes and poses that the star 20 of the video is to assume. A number of different star cast members can be posed with each being given an ID number and entered into the data questionnaire. The poses are specifically designed for the selected story contained in a predefined digital animated storyboard 15 and can be both described and illustrated in the instructions. In the initial stage of the process, once the consumer, at step 100, has chosen the story and purchased the appropriate kit, the star 20 is posed in step 102 and the poses are captured on the photographic film in the camera. In step 104, spoken phrases and other sound bites directed by the instructions can also be captured if the camera 12 is equipped with an audio accessory 40 as described below.

Figure 4A:
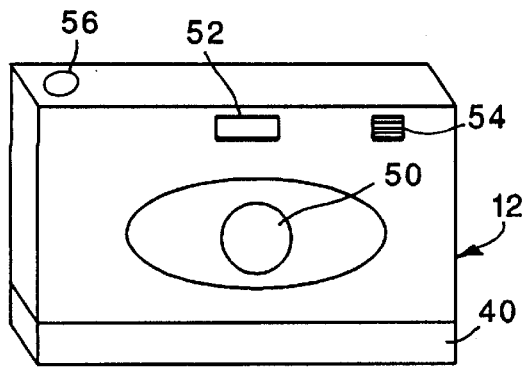
FIGS. 4a–4c are diagrammatic illustrations of a single use camera incorporating a feature of the present invention.
Figure 4B:
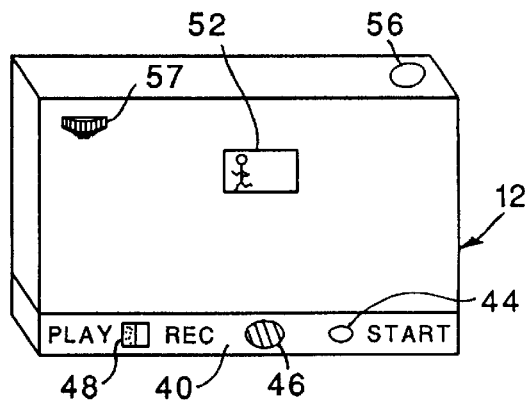
Figure 5:
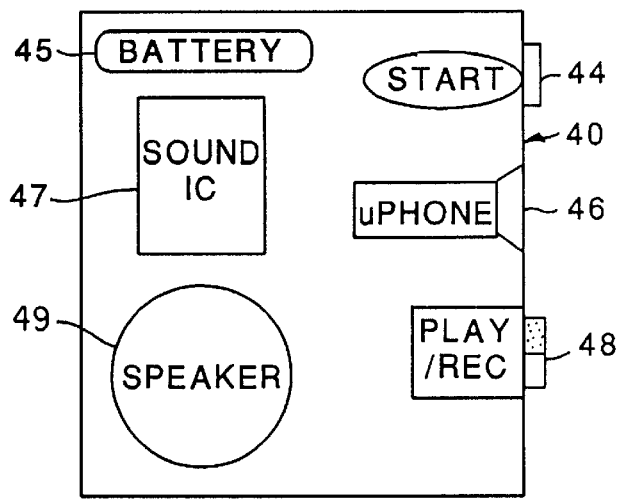
FIG. 5 is a diagrammatic illustration of an audio recording module useful with the camera of FIG. 3.
Figure 4C:
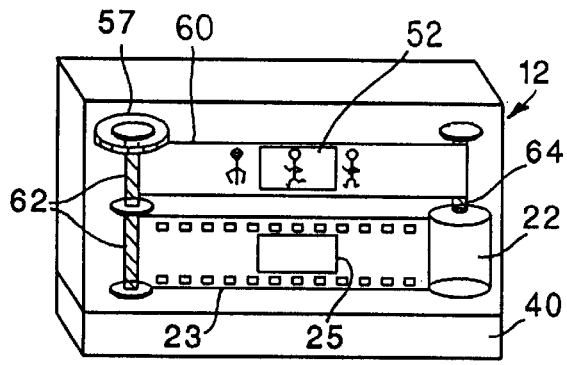

Camera 12 may comprise a single use camera, shown in FIGS. 4*a*–4*c*, which is particularly useful in preparing the posed images. Camera 12 includes the usual lens 50, viewfinder 52, flash light 54, shutter release button 56 and film advance knob 57. For recording of sound to be included in the video, an audio recording module 40 is provided. It is shown as being attached to the bottom of the camera although it can be separable from the camera and may also comprise a separate unit in the kit 10. As seen in FIG. 5, the audio module is comprised of a start (ON) button 44, power supply battery 45, microphone 46, sound IC recording chip 47, play record switch 48 and playback speaker 49. An example of an audio recording module that may be used for this purpose is an Information Storage Devices Model VM 1110 audio module. Using the audio module, the star 20 may then be recorded speaking phrases that will be used in the personalized video. Other background sounds appropriate to the story line may also be recorded as described in the instruction set 14.

In accordance with a particular feature of the invention, to aid the consumer in setting up the poses of the star 20, camera 12, as best seen in FIG. 4*c*, is provided with an elongated transparent strip 60 on which is printed a sequence of pose graphics that correspond to the pose instructions described in the text and pictures of instruction set 14. Pose strip 60 is loaded into the camera 12 at the same time as the film cartridge 22 and is wound on a supply reel 64 rotating in common with the film spool of the cartridge 22. Similarly, the film 23 and pose strip 60 are wound onto a common takeup reel 62. As film advance knob 57 is operated by the consumer to advance film 23 past film exposure gate 25 in the camera for each picture taking event, the pose strip 60 is correspondingly advanced to place each of the succession of printed poses in the viewfinder 52 to aid consumer in posing the star for each of the pictures as they are taken.

When finished with the taking of the pictures, the consumer, in the next stage of the process, fills out the order sheet at step 106 and submits the order (film, optional audio recording and order form) to the participating photofinisher. At the photofinisher, the film is processed normally at step 110 (block 24 in FIG. 2). At step 112, the film images are digitized in a film digitizer 26 using scanner equipment such as the Kodak PhotoCD PIW 4200 film digitizer. If necessary, the digitized image can be converted to a digital file format, such as PICT or TIFF, which is compatible with the animation software used subsequently. If an audio recording is sent in with the order, the audio is digitized in audio digitizer 30, such as a Farallon MacRecorder or a SoundBlaster board. The digitized signals are then stored in memory in a suitably programmed animation/image processing computer 28 for subsequent use in creating the personalized video.

Initially, at step 114, the computer operator prepares title and lead-in frames by keyboard inputting the information supplied by the consumer in the data questionnaire with the order. Then the operator, based on the required scenes on the film for the chosen story, determines at step 116 if the scene is a background shot to be used in the video (such as a hill, house etc.) or a posed shot of the star taken against the backdrop 16. If the latter, then at step 118 the computer is operated using known image extraction techniques to extract the posed image for subsequent importation into the video. The images of the star 20 can be manipulated after extraction by image editing software, such as the Adobe Photoshop magic wand and lasso tools. For some stories, body parts such as head, torso, arms and legs may be made into separate elements for ease of animation. These elements also are saved in formats compatible with the animation software.

At step 120, the preexisting, generic animated story is opened in the animation software, such as MacroMind Director. Next, at step 122, the formatted image elements derived from the consumer's film are then imported as image objects and loaded to correspond individual cast members. Each frame of the animation story script details which cast member objects (by their ID numbers) are to be placed on the screen and where. Thus, by simply changing the contents of cast member boxes, the same script can be used to make different personalized stories. It will be appreciated that the basic plot of the story, pacing and actions are always the same; however, some of the backgrounds, the characters and their voices would be different.

A sound utility program is included as part of animation programs. At step 124, the digitized audio of the star's spoken lines stored in memory are imported and also dropped into appropriate cast member boxes. Thus, predefined soundtrack links are made in the same way as the predefined character links just described. Preferably, dual soundtracks are used, one being a common soundtrack with all of the other voices pre-existing used in the story while the other track is used for the consumer supplied audio.

Once the images are imported into the storyline, the story is ready for videotaping. The video can be recorded, at step 126, in a VCR 32 (FIG. 2) from the video port of the computer 28, or by way of an NTSC converter board if computer is not an audio/visual equipped unit. The recorded videotape 34, with its personalized "movie" is then is then ready to be delivered to the consumer. Alternatively, the recorded story can be place on other suitable media, such as floppy or hard disk, CD disk, memory card, game cartridge or the like. The steps to make a personalized movie are the same as those described in connection with FIGS. 3a and 3b.

The invention has been described with reference to a preferred embodiment. However, other methods and apparatus for capturing personal images can be readily adapted to the system described such as explained in connection with the flow diagram of FIG. 1. It will be appreciated that variations and modifications can be effected by a person of ordinary skill in the art without departing from the scope of the invention.

LIST PARTS 10 kit
12 camera
14 instruction set
15 digital animated storyboard
16 backdrop
18 order form
20 star
22 film cartridge
23 film
24 film developing process
25 film exposure gate
26 film image digitizer
28 animation/image processing computer
30 audio digitizer
32 VCR
34 video tape
40 audio recording accessory module
44 audio accessory on button
45 battery
46 microphone
47 sound IC chip
48 audio play/record switch
49 speaker
50 lens
52 viewfinder
54 flash light
56 shutter release button
57 film advance knob
60 pose strip
62 film/pose strip take up reel
64 film/pose strip supply reel

What is claimed is:

1. A method of preparing a customized image presentation incorporating personal digitized images into a preexisting image presentation format; the method comprising:

providing instructions for posing of a subject in a series of predefined poses corresponding to image objects to be incorporated into said preexisting image presentation;

capturing said subject poses on an image capture medium as a sequence of subject pose images;

converting said images on the medium to digitized image signals suitable for digital image processing;

extracting and storing said digitized images of subject poses in an image processing system as sequence of digitized image objects; and incorporating said digitized image objects into said preexisting image presentation for subsequent display as a customized image presentation.

2. The method of claim 1 wherein said customized image presentation is an animated image presentation and said series of predefined posed images comprises a sequence of images forming the animated image presentation.

3. The method of claim 2 wherein portions of a subject pose are separately extracted from a posed image and used to create one or more object images intermediate sequential posed images in the series of predefined posed images to enhance the appearance of animation of the subject in the animated presentation.

* * * * *